United States Patent [19]

Amasaki et al.

[11] Patent Number: 5,530,888
[45] Date of Patent: Jun. 25, 1996

[54] PROCESS AND APPARATUS FOR CONTROLLING A PROGRAMMABLE CONTROLLER WITH EFFICIENT IDENTIFICATION OF OPERATION COMPLETION

[75] Inventors: Shinichi Amasaki; Yutaka Sawada, both of Aichi, Japan

[73] Assignee: Mitsubishi Denki Kabushiki Kaisha, Tokyo, Japan

[21] Appl. No.: 655,697

[22] Filed: Feb. 15, 1991

[30] Foreign Application Priority Data

Mar. 2, 1990 [JP] Japan .................................. 2-51095

[51] Int. Cl.$^6$ .............................. G06F 9/00; G06F 9/30; G06F 9/44; G06F 13/00
[52] U.S. Cl. .................... 395/825; 364/DIG. 2; 364/931.4; 364/931.43; 364/DIG. 1; 364/262.5; 364/262.4
[58] Field of Search .................................. 395/650, 800, 395/200, 325, 775

[56] References Cited

U.S. PATENT DOCUMENTS

| | | | |
|---|---|---|---|
| 4,390,966 | 6/1983 | Kawashima et al. | 395/755 |
| 4,608,661 | 8/1986 | Sasaki | 395/575 |
| 4,683,549 | 7/1987 | Takaki | 395/775 |
| 4,800,521 | 1/1989 | Carter et al. | 395/650 |
| 4,937,777 | 6/1990 | Flood et al. | 395/325 |
| 5,056,000 | 10/1991 | Chang | 395/650 |
| 5,056,003 | 10/1991 | Hammer et al. | 395/650 |
| 5,163,149 | 11/1992 | Brantley et al. | 395/650 |

OTHER PUBLICATIONS

Patent Abstracts of Japan vol. 14, No. 004 (P-986) Jan. 9, 1990 (JPA 12 55 933).
Patent Abstracts of Japan vol. 8, No. 254 (P-315) Nov. 21, 1984 (JPA 59 125 448).
IBM Technical Disclosure Bulletin vol. 31, No. 11, Apr. 1989, pp. 382–389 "Low–cost device for contention–free barrier synchronization".

*Primary Examiner*—Thomas C. Lee
*Assistant Examiner*—D. Dinh
*Attorney, Agent, or Firm*—Sughrue, Mion, Zinn, Macpeak & Seas; Richard C. Turner; Raymond H. J. Powell, Jr.

[57] ABSTRACT

A master programmable controller is linked to one or more processing units by a network that enables communication to or from the units under system program control. The communication is based on data link instructions that are organized in blocks, as a series of a one or more data link instructions for corresponding units, and are accessed for execution in a sequence established by a sequence program, stored at the programmable controller. One or more of the data link instructions have a corresponding operation completion flag addressing instruction for specifying the address of a flag that is set where the respective operations of the data link instructions are complete. The efficient programming and execution of the sequence program is provided by assembling the data link instructions that define communications with one or more units into a group that is served by a single operation completion flag addressing instruction. The master programmable controller memory has stored therein information concerning the operating condition, including completion status, of each of the one or more grouped data link instructions.

7 Claims, 9 Drawing Sheets

PROCESS AND APPARATUS FOR CONTROLLING A PROGRAMMABLE CONTROLLER WITH EFFICIENT IDENTIFICATION OF OPERATION COMPLETION

BACKGROUND OF THE INVENTION

1. Field of the Invention

The present invention relates to a process of controlling a programmable controller (PC) for transferring data to and from processing units linked therewith.

2. Description of the Background Art

FIG. 6 is a block diagram illustrating a master station 1 containing a programmable controller 2, employing a conventional PC controlling process, and slave stations 3 and 13, comprising coding devices, readers and the like. Processing units 4 and 14 are provided in the slave stations 3 and 13, respectively, and may be in the master station 1 as well. A cable 5 links the master station 1 to its adjacent slave stations and links adjacent slave stations to each other. A sequence program memory 6 is used for storing a sequence program, a flag memory 7 for storing a variety of flags, and a system program memory 11 for storing a system program required to execute the sequence program. A data link instruction information area 8, e.g., a data link instruction information memory, is used for storing the contents of data link instructions for effecting data transfer between the programmable controller 2 and the processing units linked therewith, e.g., data link instruction information and addresses for storing flags that are set when the operation of each of these data link instructions are complete, e.g., operation completion flag addresses, as a set in order. A communication control data area 9 is used for temporarily storing together information concerned with each processing unit as communication control data, including the information stored in the data link instruction information area 8, for the purpose of communication control. The data link instruction information area 8 and the communication control data area 9 are provided in the system program memory 11.

FIG. 7 illustrates a sequence program for setting a flag M20 (not illustrated) provided for indicating the completion of all operations of a series of data link instructions executed for a multiple of processing units in the conventional programmable controller control method. In FIG. 7, steps S701 to S720 are steps for executing a series of the data link instructions and a series of operation completion flag addressing instructions for specifying flag addresses to be temporarily set when the respective operations of the series of data link instructions are complete. A communication command flag 701 is employed as a flag that is set when the series of ten data link instructions and the series of operation completion flag addressing instructions are executed.

At steps S721 to S730, flags M0 (702) to M9 (711) are set by the series of operation completion flag addressing instructions. These flags are automatically reset after they have been set and the sequence program is run once.

A set of instructions 734–743 for setting flags M10 (760) to M19 (769) are provided in correspondence with flags M0 (702) to M9 (711), and flags M10 (760) to M19 (769) remain set until flag RESET instructions, discussed later, are executed.

At step S731, a flag SET instruction 744, which specifies a flag address M20A and is executed when flags M10 (760) to M19 (769) are all set, sets flag M20 (not illustrated) for indicating that the operations of the entire series of data link instructions is complete.

Located at steps S732 (745) to S741 (754) are flag RESET instructions, which reset flags M10 (760) to M19 (769). These instructions are executed when the same conditions exist as those for the execution of step S731, i.e. flags M10 (760) to M19 (769) are all set.

FIG. 8 illustrates part of the memory contents of the link instruction information area 8 shown in FIG. 6. In FIG. 8, a first data link instruction 801 is composed of information included in the data link instructions that are employed for data transfer to and from a first processing unit 4 and are written in the sequence program, e.g., the processing unit number as a transfer source or destination, a memory address as a transfer source or destination, etc. An operation completion flag address 802, specified by the operation completion flag addressing instruction, is written subsequent to the data link instruction in the sequence program.

The data link instruction information 801 and the operation completion flag address 802 are employed as a set and comprise a "data link instruction-related information group" 821 used for data transfer to and from the first processing unit 4.

Several data link instruction-related information groups 821 to 830 are stored sequentially in the data link instruction information area 8, in correspondence with the data link instruction and operation completion flag addressing instructions written in the sequence program.

Although FIG. 7 illustrates the execution of a single data link instruction for each processing unit, multiple data link instructions for each unit may be executed. FIG. 9 illustrates a sequence program employing the conventional programmable PC process where several data link instructions (four in FIG. 9) are executed for the same processing unit 4.

In FIG. 9, flag 901 at step S901 is a communication command flag, stored in the flag memory 7, that is accompanied by a first data link instruction 902, executed when the communication command flag 901 is set. At step S902, an operation completion flag addressing instruction 902 specifies an address M30A for storing a flag M30 (911) that is set when the operation of the first data link instruction 902 is complete.

At step S903, a second data link instruction 903 is executed subsequent to the first data link instruction 902. The second data link instruction 903 is executed when flag M30 (911), stored at the address M30A specified at step S902, is set.

At step S904, an operation completion flag addressing instruction 907 specifies an address M31A for storing a flag M31 (912) that is set when the operation of data link instruction 903 is complete.

Third and fourth data link instructions 904 and 905, at steps S905 to S908 are instructions for performing operations similar to those effected by the second data link instruction 903 at steps S903 and S904.

At step S909, a flag SET instruction 910 specifies an address M50A and is executed when the operation of the fourth data link instruction 905 is complete at step S907. In this regard, a flag M33 (914) is set for setting a flag M50 (not illustrated) for indicating that the operations of the first data link instruction 902 to fourth data link instruction 905 for unit 4 are all complete.

The system operation will now be described. Referring to FIG. 7, when the communication command flag 701 stored in the flag memory 7 is set at step S701, the series of instructions 712 to 721 and 722 to 731, for effecting data transfer between the programmable controller 2 and a first of several processing units are executed.

When the operation of the data link instruction 712 for data transfer to or from the first processing unit 4 is completed at step S701 by the operation completion flag addressing instruction 722 at step S702, M0A is specified as a memory address for storing operation completion flag M0 (702), which is set as the sequence program is run once.

At steps S703 to S720, the operations of the instructions used for the second processing unit 14 through tenth processing unit (units 3–10 are not illustrated in FIG. 6) are performed in correspondence with those of the data instruction 712 and the operation completion flag addressing instruction 722, specifying address M0A, employed for the first processing unit 4 at steps S701 and S702.

When flag M0 (702), specified by operation completion flag addressing instruction 722 at step S702, is set at step S721, flag M10 (760) is set by FLAG SET instruction 734. This stores at address M10A the fact that flag M0 (702) has been set.

At steps S722 to S730, flags M11 (761) to M19 (769) related to the second processing unit 14 through the tenth processing unit are set in the same manner that flag M10 (760), related to the first processing unit 4, was set at step S721.

When all flags M10 (760) to M19 (769) have been set at step S731, FLAG SET instruction 744 is executed to set flag M20 (not illustrated). This stores the fact that the operation of the data link instruction 712 for transfer to or from the first processing unit 4 through the operation of the data link instruction 721 for data transfer to or from the last processing unit (not illustrated) are all complete.

FLAG RESET instruction M10 (745) to M19 (754) at steps S732 to S741 cause flags M10 (760) to M19 (769) to be reset.

Information set in the data link instruction information area 8, when the sequence program shown in FIG. 7 is executed, will now be described with reference to FIG. 8. When the communication command flag 701 is set at step S701 in FIG. 7 and the data link instruction 712 for data transfer to or from the first processing unit 4 is executed, the information included in the data link instruction 712 for data transfer to or from the first processing unit 4, e.g., a processing unit number as a transfer source or destination ("1" for the first unit in this case), the memory address as a transfer source or destination, etc., is written to the data link instruction information area 8 as data link instruction information 801 shown in FIG. 8.

When the operation completion flag addressing instruction M0 (722) is executed at step S702, M0A is employed as the address of flag M0 (702) and is written to the data link instruction information area 8 as the operation completion flag address 802 in FIG. 8.

At steps S703 to S720, the operation performed for the first processing unit 4 at steps S701 and S702 is effected in a similar manner for the second processing unit 14 to the tenth processing unit, and the data link instruction-related information 822 for the second processing unit 14 through the data link instruction-related information 830 for the tenth processing unit are written to the data link instruction information area 8. While the sequence program is run repeatedly, the information is written to the data link instruction information area 8 only once after the communication command flag 701 is set.

Data transfer between the programmable controller 2 and the first processing unit 4 through the tenth processing unit in accordance with the information stored in the data link instruction information area 8 will now be described.

Assuming that the instructions for the first processing unit 4 are being processed every time the sequence program is executed once, a control part (not illustrated) included in the second processing unit 14 checks the contents of the communication control data area and data link instruction information area 8. If the operation performed immediately beforehand for processing unit 4 is already compete and there is data link instruction-related information which can be started for processing unit 14, a start is effected. When an interrupt signal that occurs periodically at a predetermined period of time is generated, a data transfer is effected to and from processing unit 14 in accordance with the communication control data stored in the communication control data area 9. Further, the information related to the data link instruction for unit 4, which has already completed its operation and terminated the operation of holding the corresponding operation completion flag in the set state while the sequence program is executed once, is erased from the data link instruction information area 8. This process is applied correspondingly to each of the remaining processing units.

As mentioned above, operation completion flag addressing instructions 722 to 731, specifying the addresses of flags M0 to M9, must be written in the sequence program in correspondence with each of the data link instruction 712, for data transfer to or from the processing unit 4, through the data link instruction 721, for data transfer to or from the processing unit 10 (not illustrated). Instructions 722 to 731 are used to set flag M20 (not illustrated). Flag M20 indicates whether or not the operations of the data link instruction 712 for data transfer to or from the first processing unit 4 through the data link instruction 721 for data transfer to or from the tenth processing unit (not illustrated) are all complete. Moreover, since flags M0 (702) to M9 (711) specified by operation completion flag addressing instructions for flags M0 (722) to flags M9 (731) are only set as the sequence program is run once, flags M10 (760) to M19 (769) must be provided in correspondence with flags M0 (702) to M9 (711), and steps S721 to S730 are all required in order to store the fact that any one of the flags M0 (702) to M9 (711) has been set while the sequence program is running once. Furthermore, step S731, for setting flag M20 (not illustrated) when all flags M10 (760) to M19 (769) have been set, must be provided. Finally, a sequence program, for resetting flags M10 (760) to M19 (769) that previously have been set, must be provided; and, a sequence program, for resetting flags M10 (760) to M19 (769) at steps S732 to S741, must be written.

As previously discussed, FIG. 9 illustrates a sequence program for executing a plurality of data link instructions composed of a first data link instruction 902 to fourth data link instruction 905 for the same processing unit, wherein each subsequent data link instruction is allowed to be executed only after completion of the operation of the data link instruction currently being executed. Therefore, the sequence program must be written so that only when the operation completion flag of the data link instruction executed immediately beforehand is set, can the operation of the next data link instruction be started. As illustrated in FIG. 7, it is also necessary to program the operation completion flag addressing instructions Mn (where n is an integer) in correspondence with respective data link instructions l (where l is an integer).

With the known programmable controller controlling process made up as described above, the sequence program cannot be written easily. For example, when it is only desired to store into the operation completion flag addresses 722–731 the information indicating whether or not the operation of a multiple of instructions for effecting data transfer to and from the processing units linked with the programmable controller in the master station are all complete, an operation completion flag addressing instruction 722–731 for specifying the address for storing the operation completion flag for each of the multiple instructions must be written in the sequence program in addition to the multiple instructions 712–721. This additional effort is time consuming and inefficient.

SUMMARY OF THE INVENTION

It is, accordingly, an object of the present invention to overcome the disadvantages of the prior art by providing a programmable controller controlling process which ensures ease of programming. Thus, when it is only needed to store into the operation completion flag addresses the information indicating whether the operations of a multiple of instructions for effecting data transfer to and from the processing units linked with the programmable controller in the master station are all complete or not, the programmable controller controlling process of the present invention does not require an operation completion flag addressing instruction to be written for each of the multiple instructions.

The present invention concerns a process for controlling a programmable controller provided in a master station for running a sequence program, including plural data link instructions for effecting data transfer between the programmable controller and processing units, provided in the master station or in slave stations linked with the master station, and an operation completion flag addressing instruction for specifying operation completion flag addresses employed as addresses for storing an operation completion flag set on completion of the operations of said multiple data link instructions. The invention comprises a step of transferring the contents of the multiple data link instructions and the operation completion flag addresses to a data link instruction information memory having a memory area for storing the contents of the multiple data link instructions, a memory area for storing the operation completion flag addresses, and a memory area for storing data link instruction operating condition information provided in correspondence with each of the multiple data link instructions and including information on whether or not the operations of the data link instructions are complete. It further comprises a step of executing the multiple data link instructions and setting the operation completion flag when all of said data link instruction operating condition information corresponding to the multiple data link instructions have shown operation completion conditions, while concurrently updating the data link instruction operating condition information serially in accordance with the information stored in the data link instruction information memory.

In the process for controlling a programmable controller according to the present invention, when the programmable controller runs a sequence program, including a multiple of data link instructions and an operation completion flag addressing instruction for specifying operation completion flag addresses employed as addresses for storing an operation completion flag set on completion of the operations of said multiple data link instructions, the contents of the multiple data link instructions and the operation completion flag addresses are transferred to a data link instruction information memory having a memory area for storing the contents of the multiple data link instructions, a memory area for storing the operation completion flag addresses, and a memory area for storing data link instruction operating condition information provided in correspondence with each of the multiple data link instructions, and including information on whether or not the operations of the data link instructions are complete. The multiple data link instructions are executed and the operation completion flag is set when all of the data link instruction operating condition information corresponding to the multiple data link instructions have shown operation completion conditions, while concurrently the data link instruction operating condition information is updated serially in accordance with the information stored in the data link instruction information memory.

PREFERRED EMBODIMENT OF THE PRESENT INVENTION

The present invention will now be described with reference to FIG. 1, which illustrates an overall configuration of a master station employing one embodiment of the present invention and slave stations linked therewith.

Figure 1:
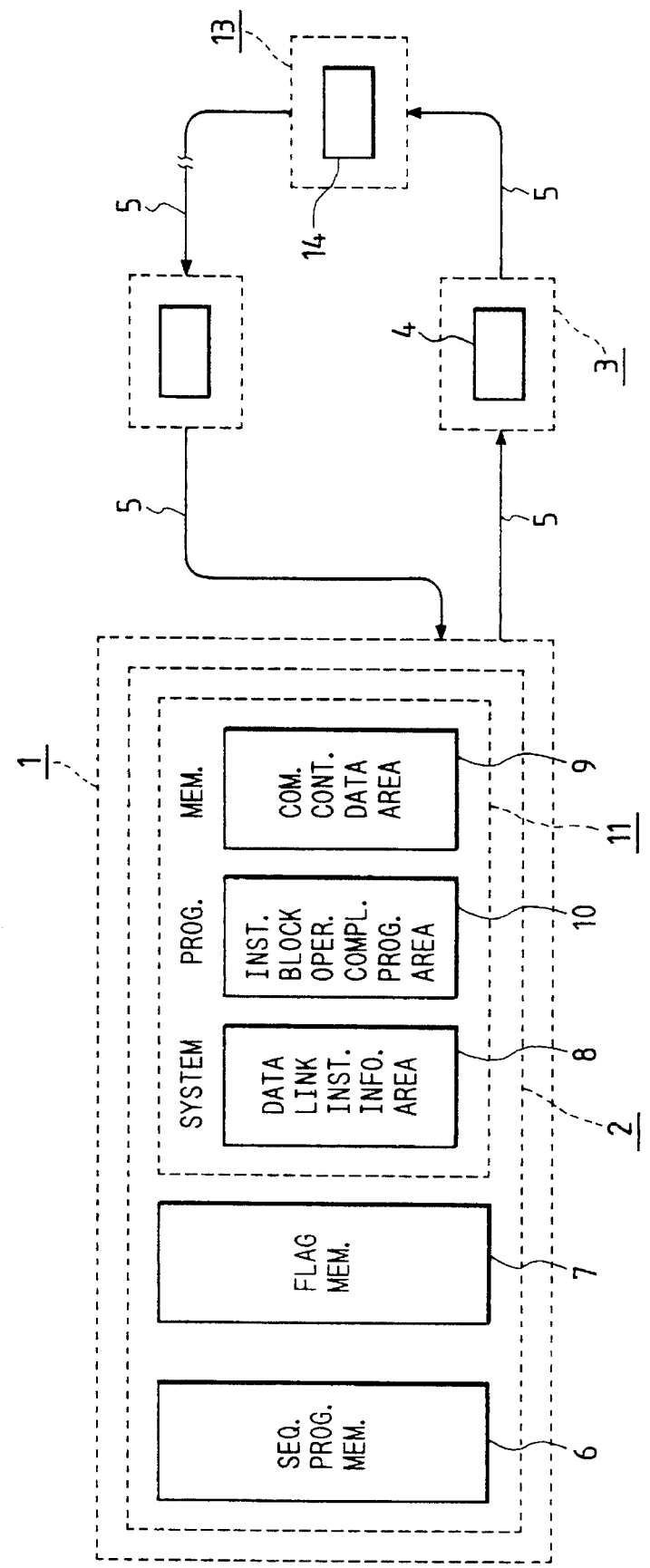
FIG. 1 is an overall configuration block diagram illustrating a master station and slave stations to which one embodiment of the present invention applies.
Figure 3:
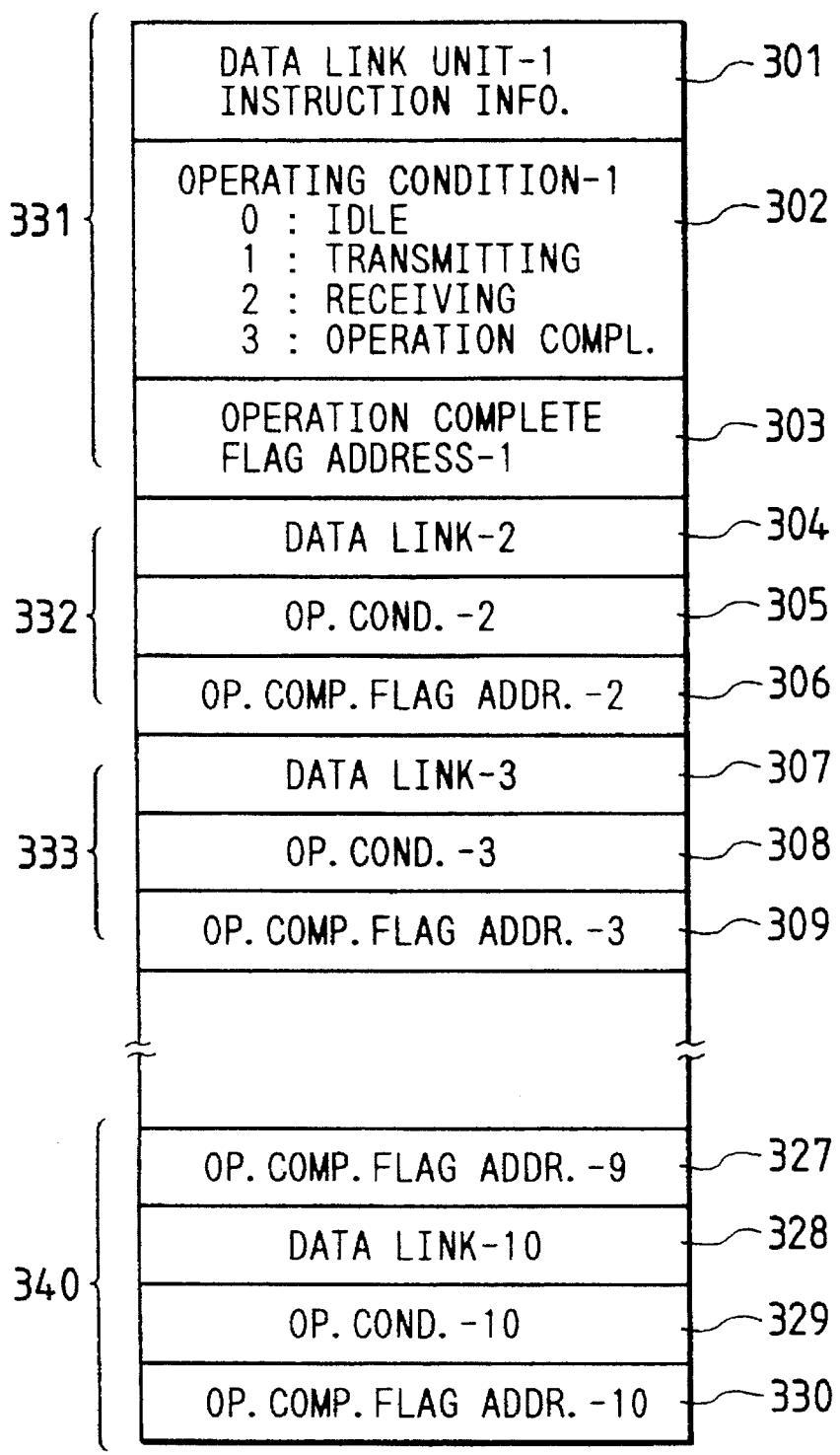
FIG. 3 illustrates information stored in a data link instruction information area in one embodiment of the present invention.
Figure 6:
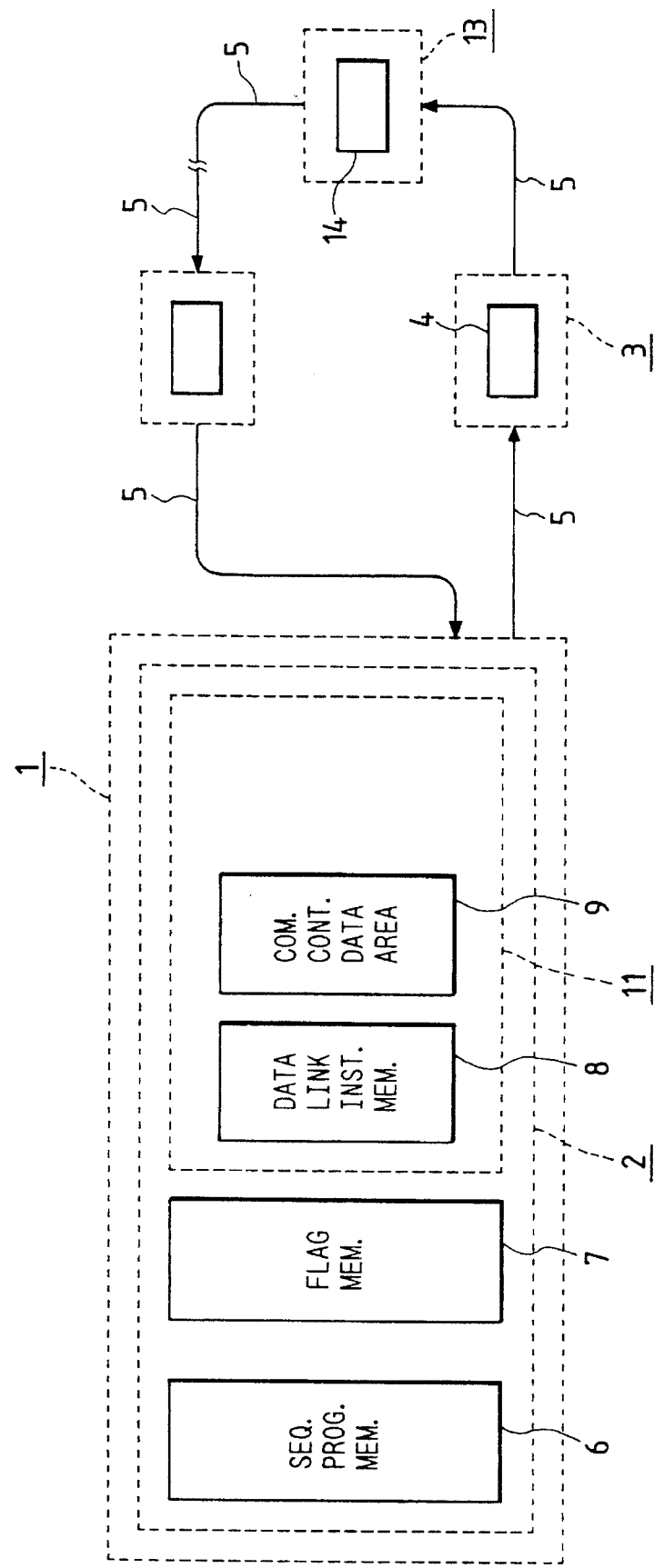
FIG. 6 is an overall configuration block diagram illustrating a master station and slave stations to which the conventional programmable controller controlling process applies.
Figure 8:
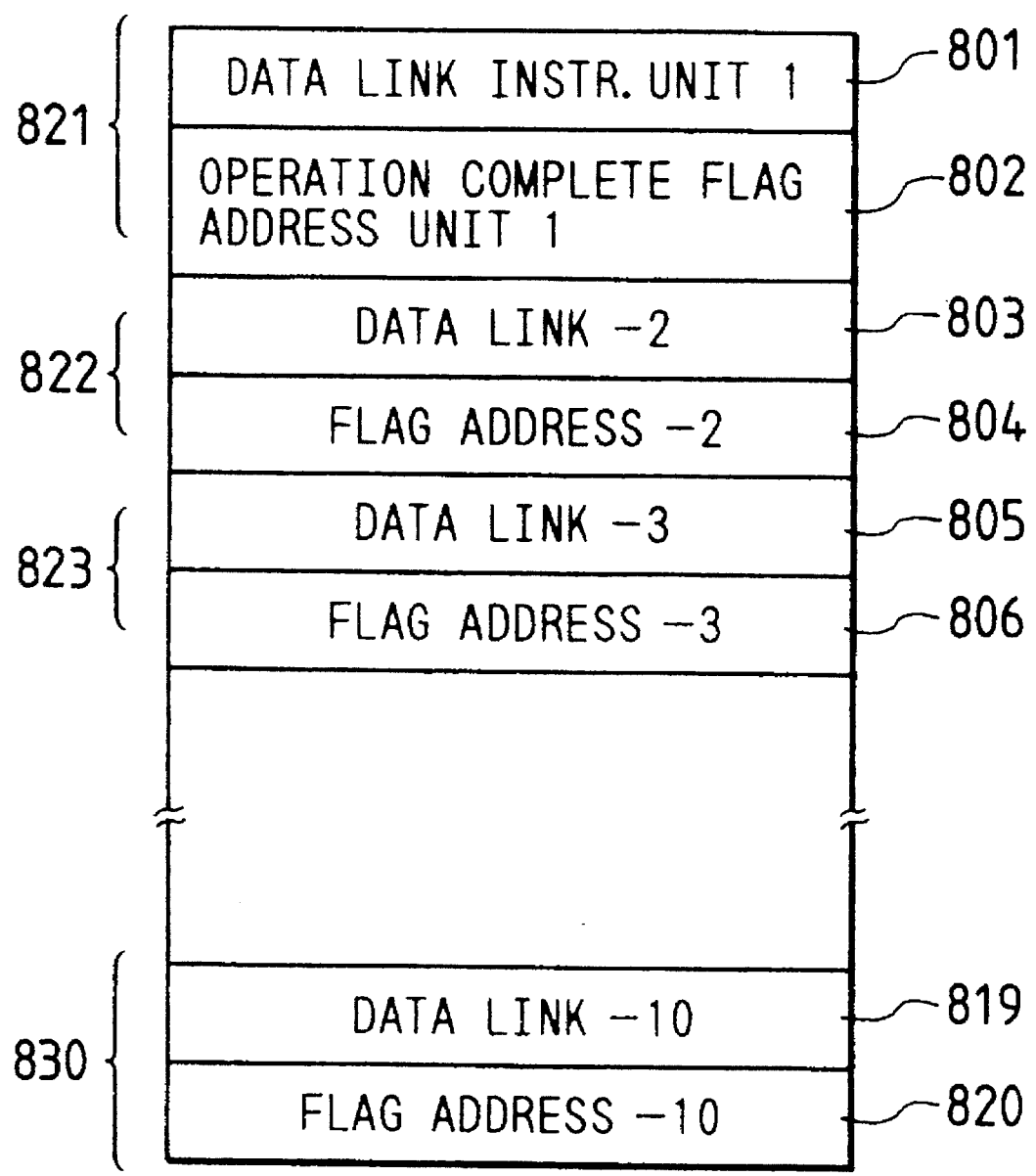
FIG. 8 illustrates a data link instruction information area in the conventional programmable controller controlling process.

Referring to FIG. 1, the elements 3 to 7, 9, 13 and 14 are identical to those elements shown in FIG. 6, illustrating the conventional process. Element 8 is similar to the one shown in FIG. 8, but differs in that it has additional data link instruction operating condition information 302, 305, 308, . . . 329, as shown in FIG. 3. An instruction block operation completion processing program area 10 is used to store an instruction block operation completion processing program having a function to set one operation completion flag automatically when the operation of a series of data link instructions in a sequence program are complete. If the series of data link instructions and the operation completion flag addressing instruction have been written in the sequence program, it is only needed to store into appropriate operation completion flag addresses information on whether or not the operations of the series of data link instructions are complete. It will ba appreciated that this permits one of the processing units to check operating condition information stored in memory of the programming controller concerning another processing unit.

Figure 2:
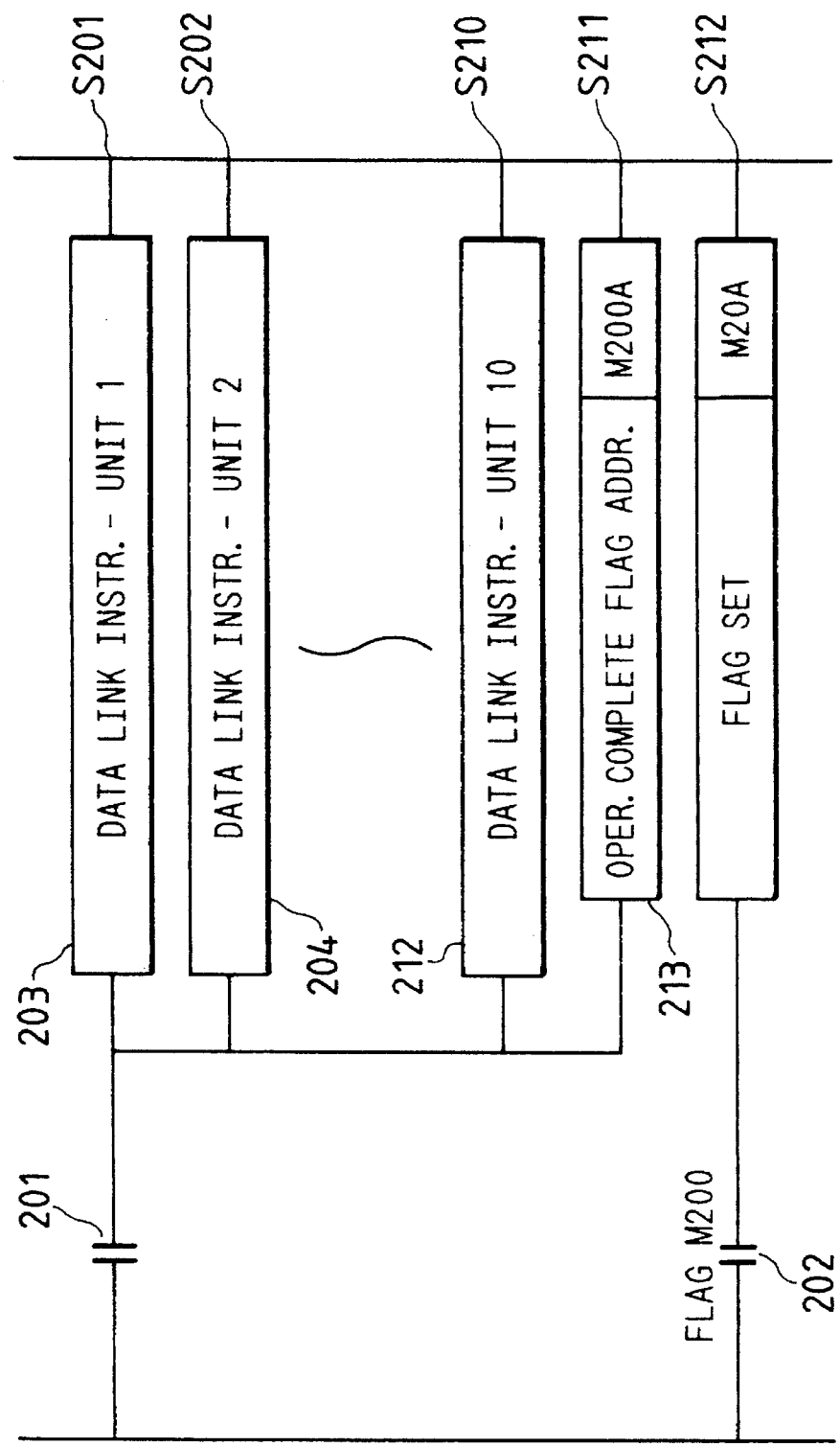
FIG. 2 shows a sequence program example according to one embodiment of the present invention for executing data link instructions for a plurality of processing units and setting an operation completion flag on completion of all the operations of the data link instructions for the multiple processing units.
Figure 7:
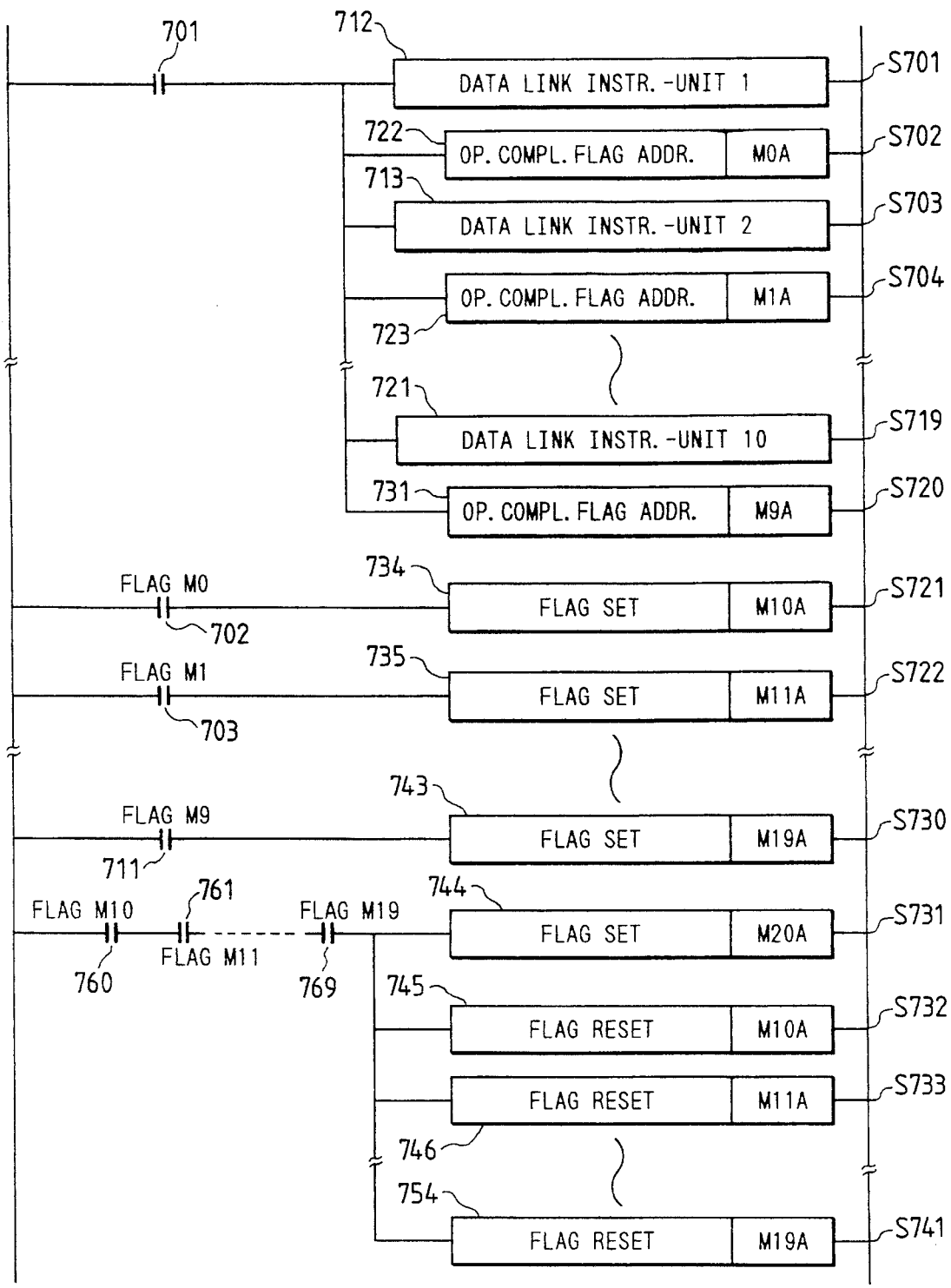
FIG. 7 illustrates a sequence program in the conventional programmable controller controlling process.

Operation of the system in accordance with the present invention will now be described. FIG. 2 illustrates a sequence program for use in the programmable controller controlling process according to one embodiment of the present invention. The illustrated program corresponds to the sequence program employed in the conventional programmable controller controlling process shown in FIG. 7.

In FIG. 2, steps S201 to S211 are executed when a communication command flag 201 is set, data link instructions for effecting data transfer to or from a first processing unit 4 through a tenth processing unit (units 3–10 are not illustrated in FIG. 1) are executed at steps S201 to S210, and the address M200A of an operation completion flag set on completion of all operations of steps S201 to S210 is specified at step S211. Since the operation completion flag M200 (202) specified by the operation completion flag address M200A is only set when the sequence program is executed once, after the operations of steps S201 to S210 are all complete, flag M20 (not illustrated) specified at flag address M20A is set at step S212 to store the fact that flag M200 (202) has been set. The presence of an identical operation completion flag at each instruction for a common processing unit permits an efficient execution of all related instructions for that unit.

By executing the sequence program shown in FIG. 2, information written in the data link instruction for data transfer to or from the first processing unit 4 is written to the data link instruction information area 8 shown in FIG. 3 at step S201 as the data link instruction information 301, e.g., a processing unit number as a transfer source or destination (1 in this case) and a memory address as a transfer source or destination, when the communication command flag 201 is set.

At steps S202 to S210, the operation performed for the first processing unit 4 at step S201 is effected in a similar manner for the second processing unit 14 to the tenth processing unit. Also, data link instruction-related information 332 for data transfer to or from the second processing unit 14 through data link instruction-related information 340 for data transfer to or from the tenth processing unit are written to the data link instruction information area 8. Although the sequence program is run repeatedly, the information is only written to the data link instruction information area 8 once, after the communication command flag 201 has been set, as in the conventional programmable controller controlling process.

Zeroes are first written to all operation completion flag addresses 303, 306, 309, . . . 327. Thereafter, the content of flag address M200A, written at step S211 in FIG. 2, is transferred to operation completion flag address 330. Subsequently, an instruction block operation completion processing program is executed to set all of the remaining operation completion flag addresses, e.g., 303, 306, 309, . . . 327, to M200.

Data transfer made between the programmable controller 2 and the first through tenth processing units (not illustrated), in accordance with the information stored in the data link instruction information memory 8, will now be described.

As described in the case of the conventional process, a control part (not illustrated) included in the programmable controller 2 checks the contents of the communication control data area 9 and data link instruction information area 8 every time the sequence program is executed once. If the operation performed for the immediately preceding processing unit is already complete and there is data link instruction-related information which can be started, a start is effected. When an interrupt signal occurring every predetermined period of time is generated, data transfer is made to and from the corresponding data unit in accordance with the communication control data stored in the communication control data area 9.

Data link instruction operating condition information 302, 305, 308, . . . 329, shown in FIG. 3, retains coded operating conditions of the data transfer to and from the corresponding processing units in continuously updated states, based on the corresponding data link instruction information.

Operation completion flag set processing will now be described with reference to FIG. 4, which is a flowchart illustrating the operation completion flag set processing operation performed each time the sequence program is run once. The operation is intended to keep track of the completion of the programmed instructions for each of the data links and is generally performed as follows. The control part (not illustrated) of the programmable controller 2 reads the data link instruction-related information sequentially from the data link instruction information area 8 and checks for any of the series of data link instruction-related information having the same operation completion flag address (i.e., where multiple instructions are performed for multiple units and have been given a single operating completion flag address, as described with respect to FIG. 3), that has not completed its operation. If there is information in a ladder block that has not yet completed the operation, the control part completes the series of data link instruction-related information. If there is no information that has not yet completed all of its operation in the series of data link instruction-related information having the same operation completion flag address, i.e. forming the same ladder block, the control area erases the series of data link instruction-related information having the same operation completion flag address from the data link instruction information area 8 and sets the corresponding operation completion flag.

Figure 4:
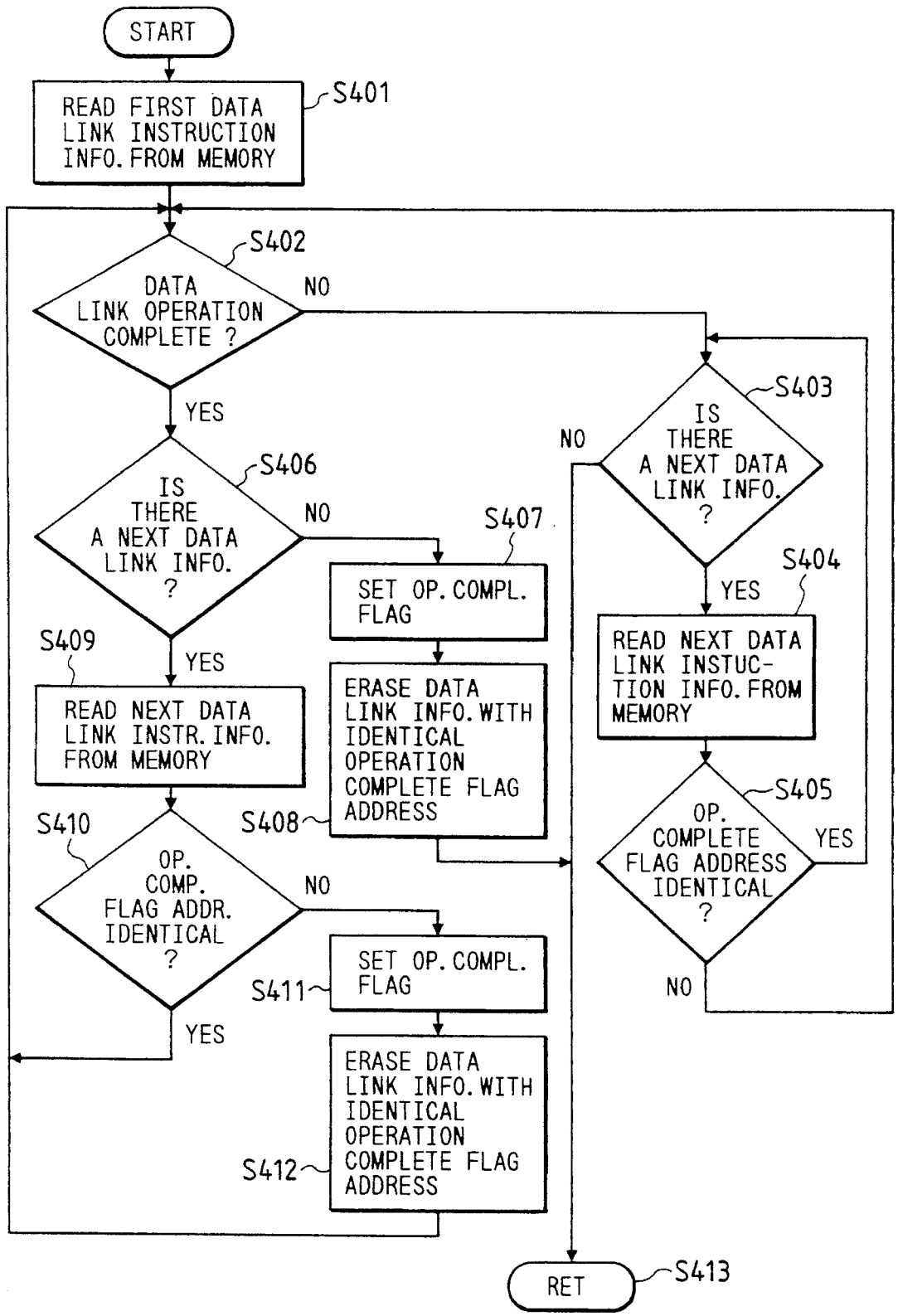
FIG. 4 is a flowchart illustrating how the operation completion flag is set in one embodiment of the present invention.

FIG. 4 will now be described in greater detail. First, at step S401, data link instruction-related information stored at the first address of the data link instruction information area 8 is read. 20 At step S402, the contents of the data link instruction operating condition information are checked. If the operation based on the data link instruction-related information is not yet complete, the execution progresses to step S403 to check whether or not the next data link instruction-related information is present. If there is no such information written, the operation completion flag set processing operation is terminated at step S413 without any further processing. If the next data link instruction-related information exists, the execution advances to the next step S404 and reads this data link instruction-related information.

Step S405 determines whether or not the read operation completion flag address is identical to the previously read address. If identical, the execution returns to step S403, judging it as data link instruction-related information corresponding to the previously executed data link instruction and forming part of a series of instructions with the same operation completion flag address.

If the operation completion flag address is different from that just read previously, the execution returns to step S402, judging it as different from the data link instruction-related information corresponding to the previously executed data link instruction and as not forming part of a series of instructions with the same operation completion flag address.

Steps S403 to S405 are steps for skipping the data link instruction-related information having the same operation completion flag address that has not yet completed the operation, if such information exists in the data link instruction information area 8. This skipping procedure permits an execution of the program in a manner more efficient than that of the conventional process.

Step S402 checks the data link instruction operating condition information of the read data link instruction-related information. If the operation is complete, the execution proceeds to step S406. If the next data link instruction-related information to be read does not exist in the data link instruction information area 8 at step S406, e.g., if information 332 of FIG. 3 did not exist, the execution progresses to step S407, determining that the data transfer processing based on the data link instruction-related information stored in the data link instruction information area 8 has been terminated.

At step S407, the operation completion flag stored at the operation completion flag address is set while the sequence program is run once. This can store the fact that the operations of the data link instructions, which were read previously in a series and have identical operation completion flag addresses, are all complete.

At step S408, the data link instruction-related information, which may correspond to a series of data link instructions having identical operation completion flag addresses, is erased from the data link instruction information area 8 and the operation completion flag set processing operation is terminated.

At step S406, if the next data link instruction-related information, e.g., information 332, is present in the data link instruction information area 8, the execution advances to step S409, reads the data link instruction-related information, e.g., information 332, from the data link instruction information area 8, and progresses to the next step S410. It will be noted that while step S409 specifically addresses reading data link instructions, both reading and transmitting of the next data link instruction to a corresponding processing unit is actually performed at this step.

At step S410, if the operation completion flag address 306 included in the data link instruction-related information 332 is identical to address 303 read previously, the execution returns to step S402, judging it to be part of a series of data link instruction-related information having an identical operation completion flag.

If the operation completion flag address 304 of the data link instruction-related information 332 read at step S410 is different from address 303 read previously, the operation concludes that any execution of a series of data link instructions having the same operation completion flag has terminated and sets the operation completion flag at step S411. Significantly, the flag is set after the sequence program is run only once.

Step S412 erases the series of data link instruction-related information written in the data link instruction information area 8 corresponding to the series of data link instructions having the same operation completion flag address, and returns to step S402.

Figure 5:
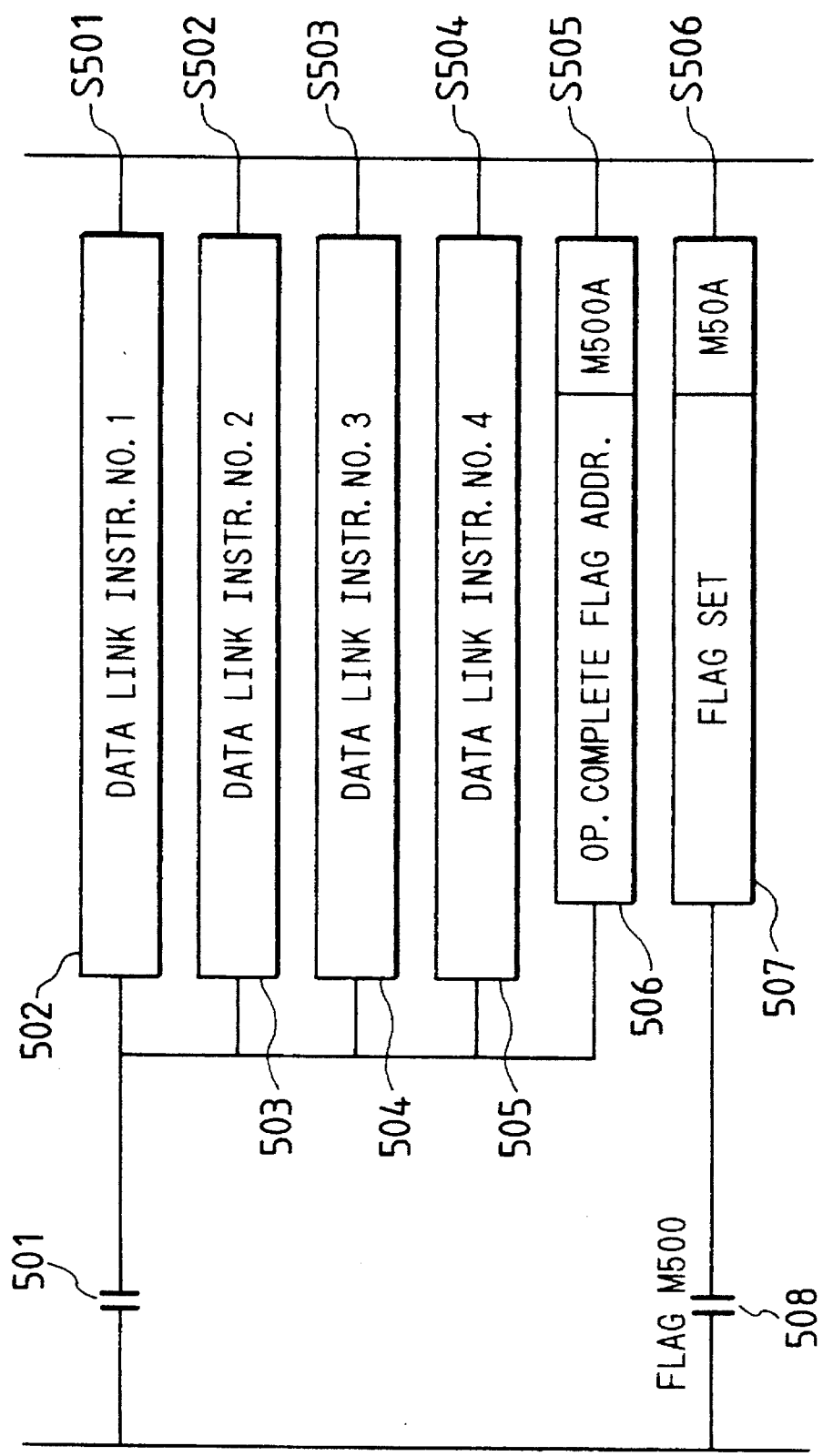
FIG. 5 shows a sequence program example according to one embodiment of the present invention for executing a plurality of data link instructions for the same processing unit and setting an operation completion flag on completion of all the operations of the multiple data link instructions for that processing unit.
Figure 9:
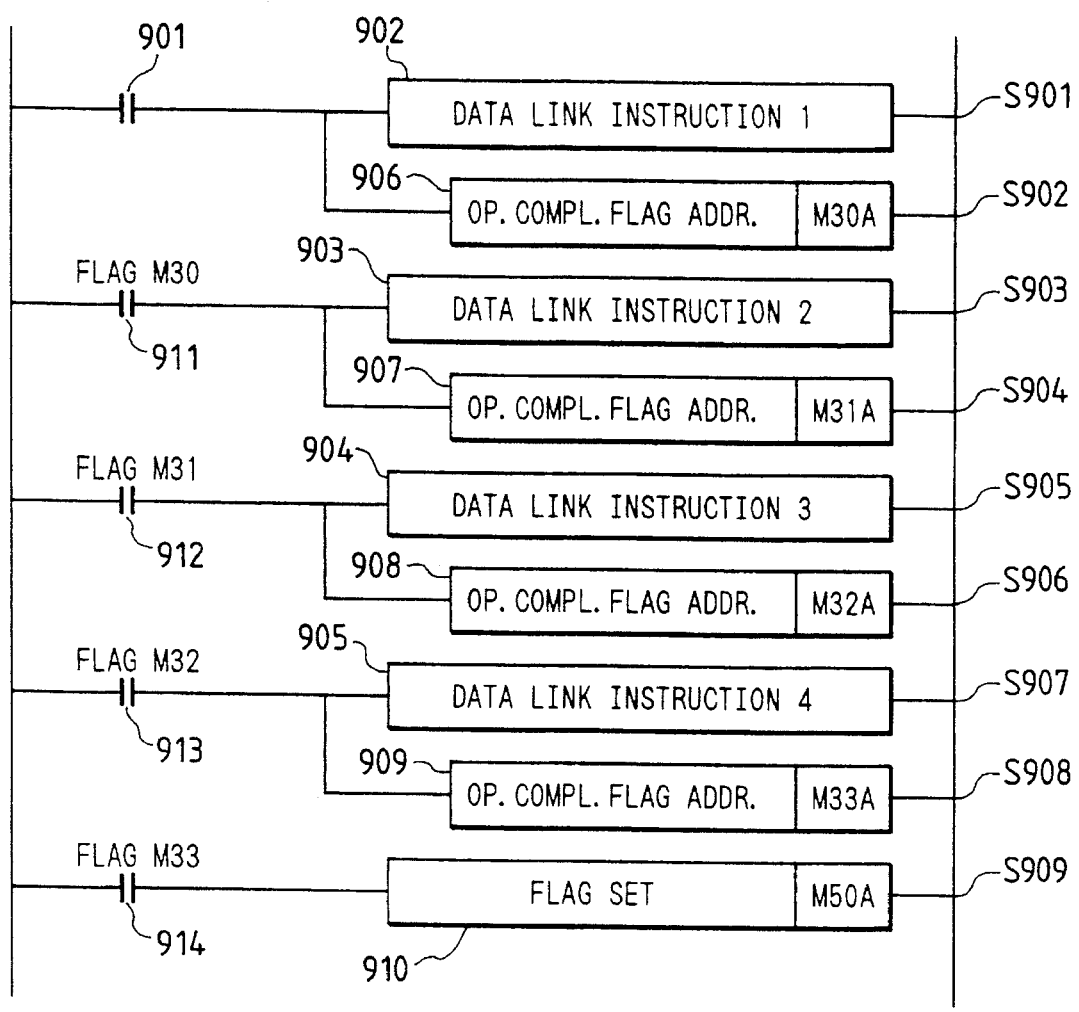
FIG. 9 illustrates a sequence program in the conventional programmable controller controlling process.

As described above, FIG. 9 shows a sequence program example according to the conventional programmable controller controlling process for data communication with the same processing unit. FIG. 5 illustrates a sequence program according to the programmable controller controlling process in one embodiment of the present invention corresponding to FIG. 9. While in FIG. 5, an operation completion flag addressing instruction is not written for each of the data link instructions 502 to 505 as compared to those in FIG. 9, an interlock is provided so that an operation according to the next data link instruction-related information is not performed before the operation effected immediately before the identical processing unit is terminated. At the same time, the flag M500 (508) specified by the operation completion flag addressing instruction M500A (506), is automatically set when the operations of first data link instructions 502 to fourth data link instructions 505 are completed, in accordance with the information stored in the data link instruction information area 8.

Other operations in executing the sequence program shown in FIG. 5 are not described because they are similar to those in the execution of the sequence program shown in FIG. 2.

It will be apparent that the invention, as described above, achieves a programmable controller process which ensures ease of program debugging and correction as well as the simplified creation of sequence programs. It also achieves a reduction of programming time, because is it is only necessary to set an operation completion flag when the operations of multiple data link instructions for data transfer between the programmable controller provided in the master station and processing units provided in slave stations or the master station, are all complete. Also, the process of the present invention only requires the multiple data link instructions and one instruction for specifying the addresses of the operation completion flag for the multiple data link instructions to be written into the sequence program.

While the present invention has been described in connection with certain preferred embodiments, it is not limited thereto; and the scope thereof is as set forth in the appended claims.

We claim:

1. A network comprising at least a programmable controller means and a plurality of processing units, said network being operative to transfer information between said programmable controller means and said plurality of processing units, said programmable controller means comprising:

sequence program means for executing multiple data link instructions, arranged in blocks of at least two data link instructions, in order to transfer data between said programmable controller means and said processing units;

memory means for storing at least execution information related to execution of each of said blocks of data link instructions and a corresponding single operation completion addressing instruction for each executed block of data link instructions, and operating means, responsive to said execution information stored in said memory means, for identifying a completion of execution of said block of data link instructions, wherein said memory means stores operating condition information in corresponding with each of said blocks of data link instructions comprises information identifying a state of the corresponding data link instruction, said states including idle, transmitting, receiving and complete.

2. A network comprising at least a programmable controller means and a plurality of processing units, said network being operative to transfer information between said programmable controller means and said plurality of processing units, said programmable controller means comprising:

sequence program means for executing multiple data link instructions, arranged in blocks of at least two data link instructions, in order to transfer data between said programmable controller means and said processing units;

memory means for storing at least execution information related to execution of each of said blocks of data link instructions and a corresponding single operation completion addressing instruction for each executed block of data link instructions, and operating means, responsive to said execution information stored in said memory means, for identifying a completion of execution of said block of data link instructions, wherein said programmable controller means further comprises communication control means for initiating the execution of said block of data link instructions and said sequence program means is responsive to said communication control means to write said execution information to said memory means, and wherein said sequence program means is operative to execute plural data link instructions for at least one processing unit and wherein said single operation completion addressing instruction is stored for all of said data link instructions.

3. A network comprising at least a programmable controller means and a plurality of processing units, said network being operative to transfer information between said programmable controller means and said plurality of processing units, said programmable controller means comprising:

sequence program means for executing multiple data link instructions, arranged in blocks of at least two data link instructions, in order to transfer data between said programmable controller means and said processing units;

memory means for storing at least execution information related to execution of each of said blocks of data link instructions and a corresponding single operation completion addressing instruction for each executed block of data link instructions, and operating means, responsive to said execution information stored in said memory means, for identifying a completion of execution of said block of data link instructions, wherein said programmable controller means further comprises communication control means for initiating the execution of said block of data link instructions and said sequence program means is responsive to said communication control means to write said execution information to said memory means, and wherein at least one of said processing units is operative to check operating condition information, stored in said memory means of said programmable controller means, concerning another processing unit.

4. The method of effecting data transfer within a network, comprising a programmable controller linked to plural processing units, said programmable controller comprising memory means for storing information for at least one block of data link instructions and a corresponding single operation completion flag address instruction for said at least one block, comprising the steps of:

executing at least one block of related data link instructions and said corresponding operation completion flag address instruction;

transferring data link instruction execution information to said memory means, said instruction execution information being representative of corresponding data link operations;

determining if all operations corresponding to said block of related data link instructions are complete and, when complete, transferring a first operation completion flag address to said memory means for storage in correspondence with said related data link instructions;

setting an operation completion flag in response to said stored execution information and said address instruction;

determining whether a data link instruction is complete based on operating condition information that identifies a state of a corresponding data link instruction, said states including an idle state, a transmitting state, a receiving state, and a completion state;

determining, when said data link operation is not complete, whether a next data link instruction exists;

reading and transmitting said next data link instruction to a corresponding processing unit; and determining whether an operation completion flag address for said next data link instruction is identical to an operation completion flag address for said data link instruction that is not completed.

5. The method of effecting data transfer within a network, comprising a programmable controller linked to plural processing units, said programmable controller comprising memory means for storing information for at least one block of data link instructions and a corresponding Single operation completion flag address instruction for said at least one block, comprising the steps of:

executing at least one block of related data link instructions and said corresponding operation completion flag address instruction;

transferring data link instruction execution information to said memory means, said instruction execution information being representative of corresponding data link operations;

determining if all operations corresponding to said block of related data link instructions are complete and, when complete, transferring a first operation completion flag address to said memory means for storage in correspondence with said related data link instructions;

setting an operation completion flag in response to said stored execution information and said address instruction;

checking whether a next data link instruction is present; and setting the operation completion flag when a next data link instruction does not exist.

6. The method of claim 5, further comprising the steps of:

reading next data link instruction related information when said next data link instruction is present, indentifying whether an operation completion flag address for said next data link instruction is identical to an operation completion flag address for a previous data link instruction, and when identical, repeating said determining step.

7. The method of effecting data transfer within a network, comprising a programmable controller linked to plural processing units, said programmable controller comprising memory means for storing information for at least one block of data link instructions and a corresponding single operation completion flag address instruction for said at least one block, comprising the steps of:

executing at least one block of related data link instructions and said corresponding operation completion flag address instruction;

transferring data link instruction execution information to said memory means, said instruction execution information being representative of corresponding data link operations;

determining if all operations corresponding to said block of related data link instructions are complete and, when complete, transferring a first operation completion flag address to said memory means for storage in correspondence with said related data link instructions;

setting an operation completion flag in response to said stored execution information and said address instruction; and setting the operation completion flag address, when an operation completion address for previous and next data link instructions are not identical.

* * * * *